(12) United States Patent
Kameda et al.

(10) Patent No.: US 7,077,446 B2
(45) Date of Patent: Jul. 18, 2006

(54) FINGER UNIT FOR ROBOT HAND

(75) Inventors: Hiroshi Kameda, Nagano-ken (JP); Kiyoto Kobayashi, Nagano-ken (JP); Junji Koyama, Nagano-ken (JP); Teizo Morimoto, Nagano-ken (JP); Masakatsu Sasahara, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 118 days.

(21) Appl. No.: 10/677,361

(22) Filed: Oct. 3, 2003

(65) Prior Publication Data

US 2005/0040664 A1 Feb. 24, 2005

(30) Foreign Application Priority Data

Oct. 7, 2002 (JP) ............................. 2002-293651

(51) Int. Cl.
  *B25J 15/10* (2006.01)
(52) U.S. Cl. ........................... 294/106; 901/31
(58) Field of Classification Search ............... 294/106; 901/25, 26, 32, 33, 34, 38; 623/63, 64
  See application file for complete search history.

(56) References Cited

U.S. PATENT DOCUMENTS

| 3,694,021 A | | 9/1972 | Mullen | |
| 4,496,279 A | * | 1/1985 | Langer | 414/735 |
| 4,573,727 A | * | 3/1986 | Iikura | 294/115 |
| 4,623,183 A | * | 11/1986 | Aomori | 294/86.4 |
| 5,437,490 A | * | 8/1995 | Mimura et al. | 294/106 |
| 5,501,498 A | | 3/1996 | Ulrich | |
| 6,119,542 A | * | 9/2000 | Arbrink | 74/490.03 |
| 2005/0040663 A1 | | 2/2005 | Kameda et al. | |

* cited by examiner

*Primary Examiner*—Eileen D. Lillis
*Assistant Examiner*—Esther Onyinyechi Okezie
(74) *Attorney, Agent, or Firm*—Buchanan Ingersoll PC

(57) ABSTRACT

An articulated finger unit has a two-jointed structure comprising a joint portion on a finger base side, a finger base portion, a joint portion on a fingertip side, and a fingertip portion; the joint portion on the finger base side has a drive-side bevel gear fixed to a rotational output shaft of an actuator, a driven-side bevel gear coaxially fixed to a joint portion that is perpendicular to the rotational output shaft, and a connecting member wherein an annular boss is fixed to the driven-side bevel gear and wherein a tip portion extends in a fork shape; and a cover on the finger base side is connected to the connecting member. A rotation of the rotational output shaft is converted to rotational movement of the joint shaft by way of a pair of bevel gears, and the connecting member fixed to the joint shaft turns right and left at an angle of 90° or more about the joint shaft. The finger unit suitable for use in a robot hand that moves at high speed and with precision can be realized.

5 Claims, 4 Drawing Sheets

FINGER UNIT FOR ROBOT HAND

CROSS-REFERENCE TO RELATED APPLICATIONS

This application claims priority under 35 U.S.C. § 119 to JP 2002-293651 filed in Japan on Oct. 7, 2002, the entire content of which is hereby incorporated by reference.

BACKGROUND OF THE INVENTION

1. Field of the Invention

The present invention relates to a finger unit suitable for use in a robot hand that is capable of accurately catching flying objects and the like at high speeds.

2. Description of the Related Art

Finger units for robot hands commonly have an articulated structure, and a high torque actuator that is small, lightweight, and as precise as possible is required for driving each finger joint in order to quickly and reliably perform gripping, picking, and throwing actions with the articulated finger unit.

Such an actuator must include a motor that fits inside the dimensions of the finger, operates at high speed, and can generate high instantaneous maximum output torque; a reduction gear that has minimal backlash with respect at a high reduction gear ratio; and a precision encoder. However, such actuators are not yet commercially available, and there are as yet no related products that could serve as components satisfying such specifications. In other words, the instantaneous maximum output torque of servomotors is insufficient, reduction gears have a large backlash of 1° angle at the output shaft even in the case of multistage planetary types, and there are no encoders that have a sufficiently narrow diameter, low weight, and high resolution.

Examples of prior art that are used to convert the rotation outputted from the rotational output shaft of the actuator in an articulated finger unit into the rotational movement of a perpendicularly oriented joint shaft include screws and rack/pinion combinations, crank mechanisms, worm gears, and wire and sheave systems or the like. With each these options, however, the joint portion acquires excessive dimensions and mass, switching during operation is too slow, and other drawbacks are encountered. The use of a regular bevel gear is problematic from the viewpoint of backlash and smooth rotation.

Conventional fingers mostly have joints that deflect to the inside of the hand in-conjunction with other fingers, and to a large extent it is impossible to perform cooperative work between fingers or to perform various other movements by using such fingers in the palm of a robot hand.

An object of the present invention is to provide a finger unit suitable for use in a robot hand that operates with much greater accuracy and speed than the operating speed of body organs beginning with human visual recognition.

SUMMARY OF THE INVENTION

To solve the problems stated above, a finger unit for a robot hand of the present invention comprises:
  a mounting flange,
  an actuator attached to the mounting flange,
  a rotational output shaft of the actuator that passes through the mounting flange and projects in the forward direction,
  a drive-side bevel gear coaxially fixed on a tip portion of the rotational output shaft,
  a pair of bearing housings that extends in a forward direction away from a front surface of the mounting flange through positions on both sides of the drive-side bevel gear,
  bearings mounted in the bearing housings,
  a joint shaft rotatably supported at both ends by the bearings, and aligned in a direction perpendicular to a center axis line of the rotational output shaft of the actuator,
  a driven-side bevel gear coaxially fixed on an outer peripheral surface of the joint shaft, and engaged with the drive-side bevel gear,
  a connecting member having one end fixed to the joint shaft, and extending in the direction perpendicular to the joint shaft, and
  a finger main body connected to a tip portion of the connecting member.

To allow a bevel gear to move without backlash, a spring plate should be mounted on an external end surface of the bearings in order to restrict the axial bias of the driven-side bevel gear fixed to the joint shaft.

Mounting a strain gauge on a side surface of the connecting member to detect torque transmitted through the connecting member will allow the torque to be detected without detecting an electric motor current of the actuator, and the transmitted torque of the finger unit to be controlled.

The joint shaft, which is center of bending, is preferably a hollow joint shaft having a hollow portion for wiring so that the wiring drawn out from the fingertip side does not swing vertically or horizontally beyond the joint portion.

To provide articulation to the finger unit according to the present invention, a structure similar to that of the finger main body and the joint portion described above should be connected to a tip of the finger main body. In the case of a two-jointed finger unit, for example, the structure should comprise:
  a second connecting member connected to a tip portion of the finger main body,
  a second actuator coaxially mounted on the second connecting member, and housed in the hollow finger main body,
  a second drive-side bevel gear coaxially fixed to a tip portion of a rotational output shaft of the second actuator,
  a pair of second bearing housings that are formed on the second connecting member and are extended in the forward direction through positions on both sides of the second drive-side bevel gear,
  second bearings mounted in the second bearing housings,
  a second joint shaft rotatably supported at both ends by the second bearings, and aligned in a direction perpendicular to a center axis line of the rotational output shaft of the second actuator,
  a second driven-side bevel gear coaxially fixed on an external peripheral surface of the second joint shaft, and engaged with the second drive-side bevel gear,
  a third connecting member having one end fixed to the second joint shaft, and extending in the direction perpendicular to the second joint shaft, and
  a second finger main body connected to a tip portion of the third connecting member.

DESCRIPTION OF THE PREFERRED EMBODIMENTS

An articulated finger unit for a high-speed robot hand to which the present invention has been applied is described below with reference to the drawings.

Figure 1:
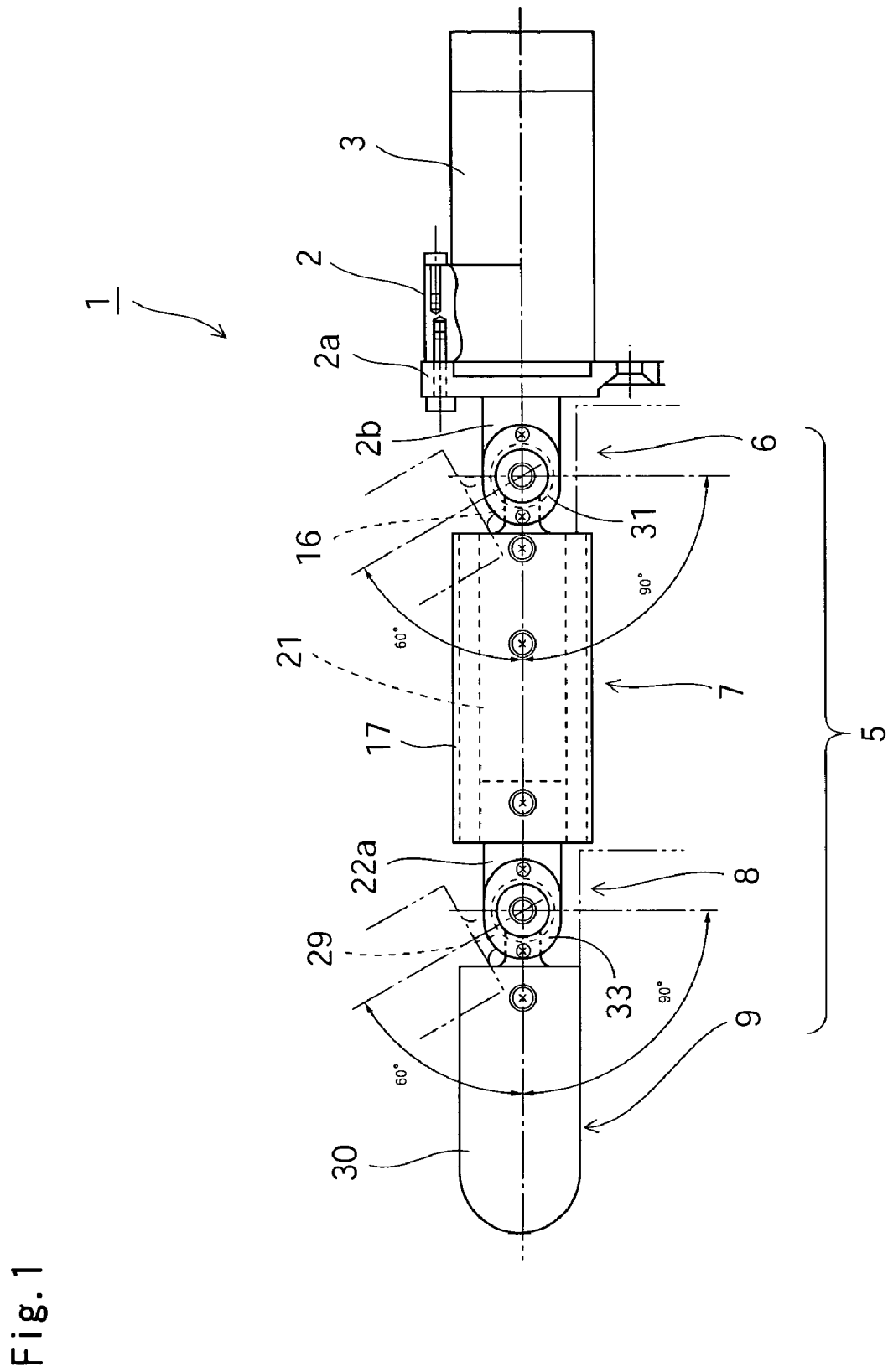
FIG. 1 is a top view of the articulated finger unit to which the present invention has been applied.
Figure 2:
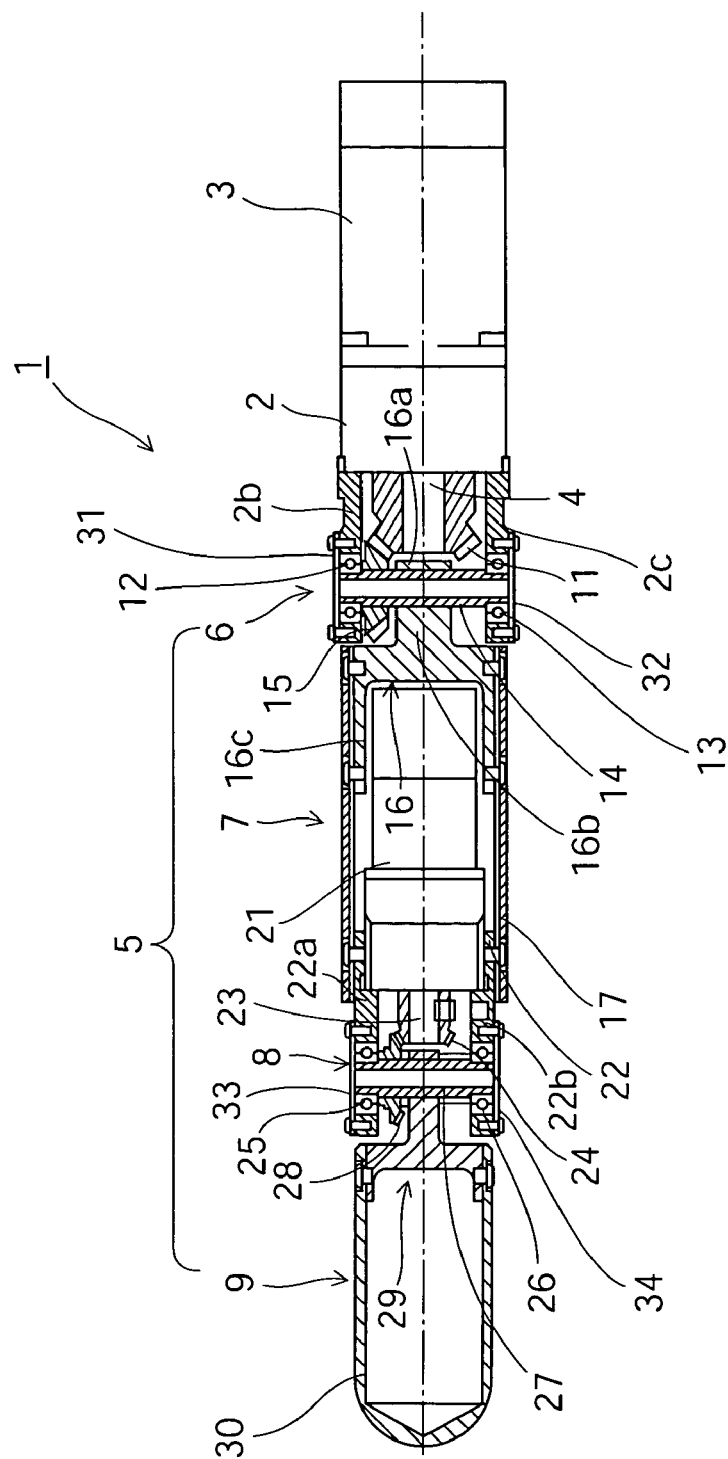
FIG. 2 is a longitudinal section of the articulated finger unit of FIG. 1.
Figure 3B:
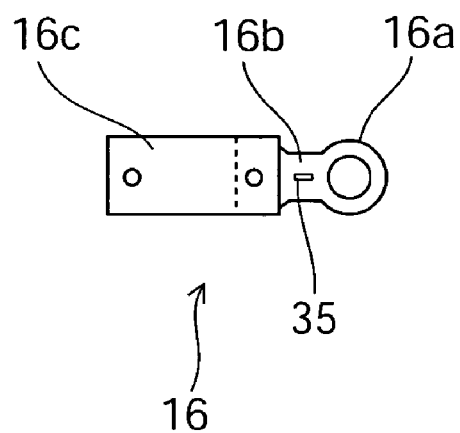
FIG. 3B is a top view showing the connecting member on finger base side incorporated therein.
Figure 3A:
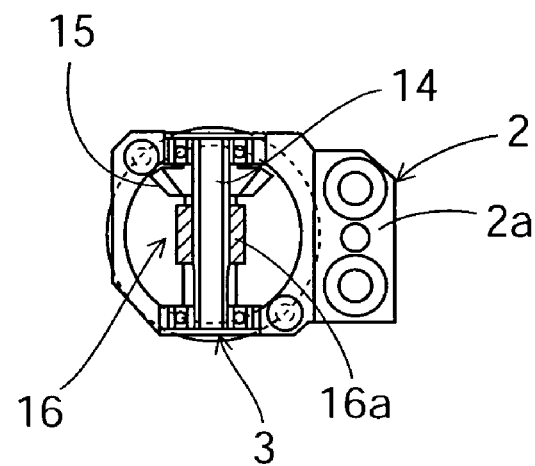
FIG. 3A is a cross-sectional view showing the joint portion on the finger base side of the articulated finger unit in FIG. 1.
Figure 4B:
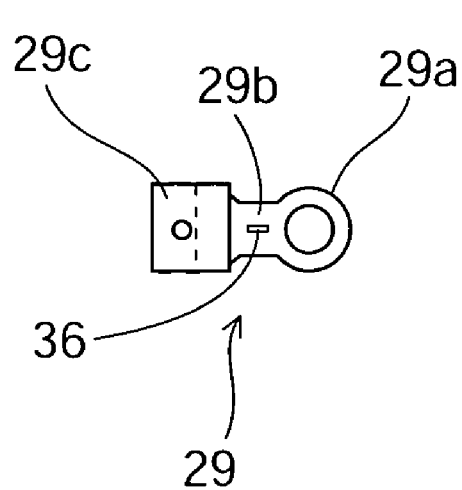
FIG. 4B is a top view showing the connecting member on fingertip side incorporated therein.
Figure 4A:
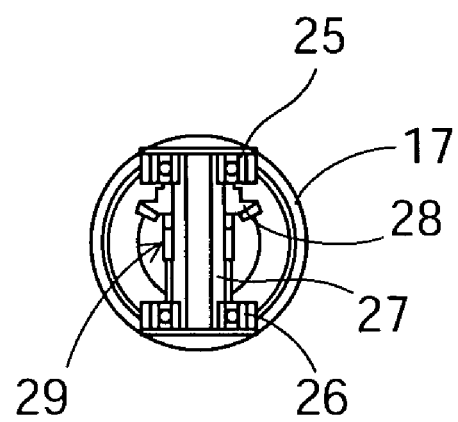
FIG. 4A is a cross-sectional view showing the joint portion on the fingertip side of the articulated finger unit in FIG. 1.

FIG. 1 is a top view that shows an articulated finger unit for a high-speed robot hand related to the present embodiment, and FIG. 2 is a cross-sectional view thereof. FIGS. 3A and 3B are respectively a cross-sectional view showing a joint portion on a finger base side of the articulated finger unit, and a top view showing a connecting member on the finger base side incorporated therein. FIGS. 4A and 4B are respectively a cross-sectional view showing a joint portion on a fingertip side of the articulated finger unit, and a top view showing a connecting member on the fingertip side incorporated therein.

With reference to the drawings, an articulated finger unit 1 has a mounting flange 2, an actuator 3 mounted on the mounting flange 2, and a finger main body unit 5 connected to a rotational output shaft 4 of the actuator 3; and the finger main body unit 5 includes a joint portion 6 on a finger base side connected to a front end of the rotational output shaft 4 of the actuator 3, a finger base portion 7 connected to a front side of the joint portion 6 of the finger base, a joint portion 8 on the fingertip side connected to the tip of the finger base portion 7, and a fingertip portion 9 connected to the front side of the joint portion 8 on the fingertip side.

More specifically, with the cylindrical actuator 3 facing forward, a front-end portion thereof is fixed to a circular aperture casing portion 2a of the mounting flange 2, and the rotational output shaft 4 passes from the front end surface thereof through the circular aperture casing portion 2a and projects forward. A drive-side bevel gear 11 is coaxially fixed to a tip portion of the rotational output shaft 4.

Here, a pair of bearing housings 2b and 2c on the finger base side passes from the upper and lower ends of the front surface of the mounting flange 2 through the top and bottom positions of the drive-side bevel gear 11, and extends in a parallel manner. A top ball bearing 12 and a bottom ball bearing 13 are respectively mounted so as to be in coaxial positions on tip portions of the bearing housings 2b and 2c on the finger base side, which project further forward than the drive-side bevel gear 11. Upper and lower ends of the joint shaft 14 on the finger base side are rotatably supported by the ball bearings 12 and 13 in a direction perpendicular (vertical, in the present example) to an axial direction of the rotational output shaft 4.

A driven-side bevel gear 15 is coaxially fixed to an external peripheral surface portion of the upper side of the joint shaft 14 in the axial direction thereof, and the driven-side bevel gear 15 engages the drive-side bevel gear 11. An annular boss 16a of a connecting member 16 is fixed at a center position in an axial direction of the joint shaft 14. The connecting member 16 comprises the annular boss 16a, a neck portion 16b that extends in the forward direction from the annular boss 16a, and a fork portion 16c that extends in the forward direction from a tip of the neck portion 16b in the form of an inverted "c". A cylindrical cover 17 on the base side is coaxially connected to the fork portion 16c.

Thus, the joint portion 6 on the finger base side connected to the front end of the rotational output shaft 4 of the actuator 3 comprises the upper and lower housings 2b and 2c on the finger base side that formed on the mounting flange 2, the top and bottom ball bearings 12 and 13, the joint shaft 14 on the finger base side, the driven-side bevel gear 15 on the finger base side, and the connecting member 16 on the finger base side. The finger base portion 7 is formed from the cylindrical base-side cover 17 connected to the fork portion 16c of the connecting member 16 on the finger base side.

Next, the joint portion 8 on the fingertip side and the fingertip portion 9 connected to the tip of the finger base portion 7 have a similar structure as the finger base portion 7 and the joint portion 6 on the finger base side. In other words, a second actuator 21 is coaxially incorporated in a hollow portion of the cover 17 on the base side, and a front-end portion of the actuator 21 is rotatably supported by an annular flange 22 similarly incorporated in the hollow portion of the cover 17 on the base side. An external peripheral surface of the annular flange 22 is fixed on an internal peripheral surface of the cover 17 on the base side.

A rotational output shaft 23 of the actuator 21 passes through a hollow portion of the annular flange 22 and coaxially projects in the forward direction, and a drive-side bevel gear 24 on the fingertip side is coaxially fixed to the tip portion thereof. A pair of bearing housings 22a and 22b on the fingertip side passes from upper and lower ends of the front surface of the annular flange 22 through top and bottom positions of the drive-side bevel gear 24, and extends in a parallel manner. A top ball bearing 25 and a bottom ball bearing 26 are respectively mounted so as to be in coaxial positions on the tip portion of the bearing housings 22a and 22b on the fingertip side, which project further forward than the drive-side bevel gear 24. Upper and lower ends of a joint shaft 27 on the fingertip side are rotatably supported by the ball bearings 25 and 26 in a direction perpendicular (vertical, in the present example) to the axial direction of the rotational output shaft 23.

A driven-side bevel gear 28 is coaxially fixed to an external peripheral surface portion of an upper side of the joint shaft 27 in the axial direction thereof, and the driven-side bevel gear 28 engages the drive-side bevel gear 24. An annular boss 29a of a connecting member 29 on the fingertip side is fixed at the center position in an axial direction of the driven-side bevel gear 28. The connecting member 29 comprises the annular boss 29a, a neck portion 29b that extends in the forward direction from the annular boss 29a, and a fork portion 29c that extends in the forward direction from the tip of the neck portion 29b (refer to FIGS. 4A and 4B). A cylindrical cover 30 on the fingertip side whose tip is closed in the form of a hemisphere is coaxially connected to the fork portion 29c.

The present example is a double-jointed finger unit comprising a joint portion on the finger base side and a joint portion on the fingertip side, but a structure comprising a single joint, or a structure comprising three joints or more is also possible.

In the articulated finger unit 1 of the present example thus structured, the rotation of the rotational output shaft 4 is converted to rotational movement of the joint shaft 14 by way of a pair of bevel gears 11 and 15, and the connecting member 16 of which one end is fixed to the joint shaft 14 turns right and left at an angle of 90° or more about the joint shaft 14. It is thus possible to realize a lightweight, high-speed, and high-precision artificial finger in which the joint portions 6 and 8 can be controllably bent at an angle of 90° or more forward and backward or right and left, and which is capable of performing a variety of operations.

The actuators 3 and 21 have a structure that comprises a servomotor rated to have high speed and maximum torque for a short time by means of high-density winding and high-density component arrangement; a short-dimension, high-torque, and low-backlash unit-type harmonic drive gearing with a high reduction gear ratio (1/50 to 1/100, for example); and a small, lightweight, and high-resolution encoder with a fast response.

In the present example, oilless bevel gears with minimal backlash serve as the bevel gears 11, 15, 24, and 28. Such bevel gears are surface-hardened after gear cutting, lapped without a backlash by means of a high-precision bevel gear lapping machine, and impregnated with a solid lubricant on a teeth surface to allow backlash-less operation without oiling.

The following is a description of the backlash-less structure of the bevel gears 11 and 15 and the bevel gears 24 and 28 used in the joint portions of the present example. With reference to FIGS. 1 and 2, in the joint portion 6 on the finger base side, spring plates 31 and 32 are mounted on an upper end surface of the top ball bearing 12 and a lower end surface of the bottom ball bearing 13 in which upper and lower ends of the joint shaft 14 are rotatably supported by the ball bearings 12 and 13. The spring plates 31 and 32 are provided for applying axial propulsion in a center direction of the bevel gear cone to the joint shaft 14 so as to limit the axial displacement of the shaft 14. Likewise, spring plates 33 and 34 that function in a similar manner are mounted in the joint portion 8 on the fingertip side.

Alternatively, the bevel gears may be mounted in a backlash-less state by using the extending and flexing force of the rotational output shaft of the actuator.

A strain gauge is provided in the articulated unit 1 of the present example to detect torque applied on the finger unit. In other words, a strain gauge 35 is mounted on a side surface of the neck portion 16b (square columnar portion) in the connecting member 16 of the joint portion 6 on the finger base side, as shown in FIGS. 3A and 3B. Similarly, a strain gauge 36 is mounted on a side surface of the neck portion 29b in the connecting member 29 of the joint portion 8 on the fingertip side, as shown in FIGS. 4A and 4B. The torque applied on the joint portions 6 and 8 can be detected based on the output of the strain gauges 35 and 36. Torque can therefore be detected and torque control performed based on the detection without the need to base the operation on the motor current of the actuators 3 and 21.

The joint shafts 14 and 27 that define a center of bending of the joint portions 6 and 8 of the present example are hollow joint shafts. The lead wires of the strain gauge 36, the fingertip-side actuator 21, and other components disposed closer to the fingertip and away from the joint shafts 14 and 27 are laid using the hollow portions of these hollow joint shafts, making it possible to prevent the wires from becoming frayed or otherwise affected during rotation of the main joint shaft 8.

As described above, the finger unit for a robot hand of the present invention comprises a single or plurality of joint portions; the finger base portion, fingertip portion, and other components of individual finger main bodies can be controllably bent up and down or right and left through an angle 90° or more about these joint portions; and such controlled bending can be performed at a high speed of 50 msec or less, for example. A high-speed robot hand capable of performing of a variety of operations accurately and at high speed, such as throwing objects and catching high-speed soaring or flying objects, can be obtained using the finger unit of the present invention.

What is claimed is:

1. A finger unit for a robot hand comprising:
   a mounting flange,
   an actuator attached to the mounting flange,
   a rotational output shaft of the actuator that passes through the mounting flange and projects in the forward direction,
   a drive-side bevel gear coaxially fixed to a tip portion of the rotational output shaft,
   a pair of bearing housings that extends in a forward direction away from a front surface of the mounting flange through positions on both sides of the drive-side bevel gear,
   bearings mounted in the bearing housings,
   a joint shaft rotatably supported at both ends by the bearings, and aligned in a direction perpendicular to a center axis line of the rotational output shaft of the actuator,
   a driven-side bevel gear coaxially fixed on an external peripheral surface of the joint shaft, and engaged with the drive-side bevel gear,
   a connecting member having one end rotatably fixed to the joint shaft, and extending in the direction perpendicular to the joint shaft, and
   a finger main body rotatably fixed to a tip portion of the connecting member.

2. The finger unit for a robot according to claim 1, wherein a spring plate is mounted on an external end surface of the bearings to restrict the axial bias of the driven-side bevel gear fixed to the joint shaft.

3. The finger unit for a robot hand according to claim 1, wherein a strain gauge is mounted on a side surface of the connecting member to detect torque transmitted through the connecting member.

4. The finger unit for a robot hand according to claim 1, wherein the joint shaft is a hollow shaft comprising a hollow portion for wiring.

5. The finger unit for a robot hand according to claim 1, comprising:
   a second connecting member connected to a tip portion of the finger main body,
   a second actuator coaxially mounted on the second connecting member, and housed in the hollow finger main body,
   a second drive-side bevel gear coaxially fixed to a tip portion of a rotational output shaft of the second actuator,
   a pair of second bearing housings that are formed on the second connecting member and are extended in the forward direction through positions on both sides of the second drive-side bevel gear,
   second bearings mounted in the second bearing housings,
   a second joint shaft rotatably supported at both ends by the second bearings, and aligned in a direction perpendicular to a center axis line of the rotational output shaft of the second actuator,
   a second driven-side bevel gear coaxially fixed on an external peripheral surface of the second joint shaft, and engaged with the second drive-side bevel gear,
   a third connecting member having one end fixed to the second joint shaft, and extending in the direction perpendicular to the second joint shaft, and
   a second finger main body connected to a tip portion of the third connecting member.

* * * * *